United States Patent [19]

Berndt

[11] Patent Number: 4,511,265

[45] Date of Patent: Apr. 16, 1985

[54] TEMPERATURE-RESPONSIVE PACIFIER ASSEMBLY

[75] Inventor: Dieter R. Berndt, Neptune, N.J.

[73] Assignee: TRP Energy Sensors, Inc., New York, N.Y.

[21] Appl. No.: 470,463

[22] Filed: Feb. 28, 1983

Related U.S. Application Data

[63] Continuation-in-part of Ser. No. 351,107, Feb. 22, 1982, Pat. No. 4,447,164.

[51] Int. Cl.³ .................... G01K 1/08; G01K 11/12
[52] U.S. Cl. .................................. 374/151; 128/736
[58] Field of Search ............... 374/162, 150, 151; 116/216; 215/11 R; 128/359, 738

[56] References Cited

U.S. PATENT DOCUMENTS

| | | | |
|---|---|---|---|
| 2,046,863 | 7/1936 | Allphin | 374/162 X |
| 2,579,738 | 12/1951 | Hargreaves | 374/162 X |
| 3,260,112 | 7/1966 | Godbey et al. | 374/162 X |
| 3,669,112 | 6/1972 | Mager et al. | 215/11 R X |
| 3,782,194 | 1/1974 | Brodie et al. | 374/151 |
| 3,864,976 | 2/1975 | Parker | 374/150 X |
| 3,935,743 | 2/1976 | Brodie et al. | 374/151 |
| 4,156,365 | 5/1979 | Heinmets et al. | 374/162 |

*Primary Examiner*—Daniel M. Yasich
*Attorney, Agent, or Firm*—Louis E. Marn

[57] ABSTRACT

There is disclosed an improved temperature responsive pacifier assembly having a liquid medium disposed in an interior chamber, and a temperature-responsive element comprised of a spacer strip or element having one or more temperature display dots mounted thereon and formed of a liquid crystal material coated on a colored substrate. The liquid crystal material is responsive to a temperature above about 98.6° F. whereby the liquid crystal material clears to expose the colored substrate thereby visually indicating an abnormal temperature condition of a mammal, and in particular, a homo sapien, orally utilizing such improved pacifier assembly.

13 Claims, 2 Drawing Figures

4,511,265

TEMPERATURE-RESPONSIVE PACIFIER ASSEMBLY

This application is a continuation-in-part of U.S. Ser. No. 351,107, filed Feb. 22, 1982 now U.S. Pat. No. 4,447,164.

FIELD OF THE INVENTION

This invention relates to a pacifier assembly, and more particularly to an improved temperature-responsive pacifier assembly.

BACKGROUND OF THE INVENTION

Oral and rectal thermometers having a temperature range of from about 92° to 106° F. have been in use for many years for sensing the temperature of the human body. The use of oral thermometers with infants is particularly troublesome due to the difficulty of keeping such a thermometer in the baby's mouth under conditions and for a time sufficient to permit the inserted portion of the thermometer to reach ambient conditions therein, and thereby produce a reasonably accurate reading of the actual temperature of the subject being temperature sensed. Consequently, for newborns, rectal thermometers are generally used which are believed to cause discomfort, and again are somewhat difficult to use, although not as difficult as the use of oral thermometers.

Another form of temperature sensing devices is illustrated in U.S. Pat. No. 4,296,631 to Fergason. In U.S. Pat. No. 3,968,690 to Blouin et al, there is disclosed a pacifier assembly including a mercury thermometer device, however, the concomitant problem of glass and mercury are still present.

As infants age with concomitant cutting of teeth, the use of an oral thermometer becomes hazardous due to the possibility of breakage as well as greater awareness by the subjects to the foreign object. Generally, the use of a thermometer is to generate data as to the existence of abnormal temperature, i.e., a temperature above 98.6° F., and not necessarily the number of °F. above normal temperature to permit the institution of a corrective protocol for the subject exhibiting an above normal temperature. The use of a thermometer for a subject is generally initiated based upon observable side effects of an abnormal temperature, e.g. skin color, respiration, etc. as distinguished from any constantly observable or recognized phenomena.

In the aforementioned co-pending application U.S Ser. No. 351,107, here is disclosed a pacifier assembly including a spherical capsule of a liquid crystal material submerged in a liquid medium, such as glycerine, in the interior bulbous chamber of the pacifier assembly. The liquid crystal material is responsive to a temperature above about 100° F. whereby the liquid crystal material changes color to visually indicate abnormal temperature condition of a mammal, and in particular a homo sapien, utilizing such a pacifier assembly. Since the spherical capsule is essentially free flowing within the chamber, the pacifier assembly may not accurately and rapidly sense an abnormal condition depending upon the relative position of the spherical capsule with in the pacifier assembly to the mammal during use. E.g., if the mammal is standing up-right and the pacifier assembly extends downwardly concomitant with intermediate use, the spherical capsule tends to be point positioned proximate the guard and thus the heat transfer rate of the liquid medium might not be sufficient to cause the liquid crystal material to clear under discontinious conditions of use.

OBJECTS OF THE INVENTION

It is an object of the present invention to provide an improved temperature-response pacifier assembly for sensing an above normal temperature of a mammal, and in particular, a homo sapien.

Another object of the present invention is to provide an improved temperature-responsive pacifier assembly for sensing an above normal temperature of a mammal permitting of more efficacious sensing.

Still another object of the present invention is to provide an improved temperature-responsive pacifier assembly for more responsively sensing an above normal temperature of a mammal.

A further object of the present invention is to provide an improved temperature-responsive pacifier assembly for sensing an above normal temperature of a mammal exhibiting greater visual display of such above normal temperature condition.

SUMMARY OF THE INVENTION

These and other objects of the present invention are achieved by an improved pacifier assembly having a liquid medium disposed in an interior chamber, and a temperature-responsive element comprised of a spacer strip or element having one or more temperature display dots mounted thereon and formed of a liquid crystal material coated on a colored substrate. The liquid crystal material is responsive to a temperature above about 98.6° F. whereby the liquid crystal material clears to expose the colored substrate thereby visually indicating an abnormal temperature condition of a mammal, and in particular, a homo sapien, orally utilizing such improved pacifier assembly.

BRIEF DESCRIPTION OF THE DRAWINGS

A better understanding of the present invention as well as other objects and advantages thereof will become apparent upon consideration of the detailed disclosure thereof, especially when taken with the accompanying drawing, wherein.

DETAILED DESCRIPTION OF THE INVENTION

Figure 1:
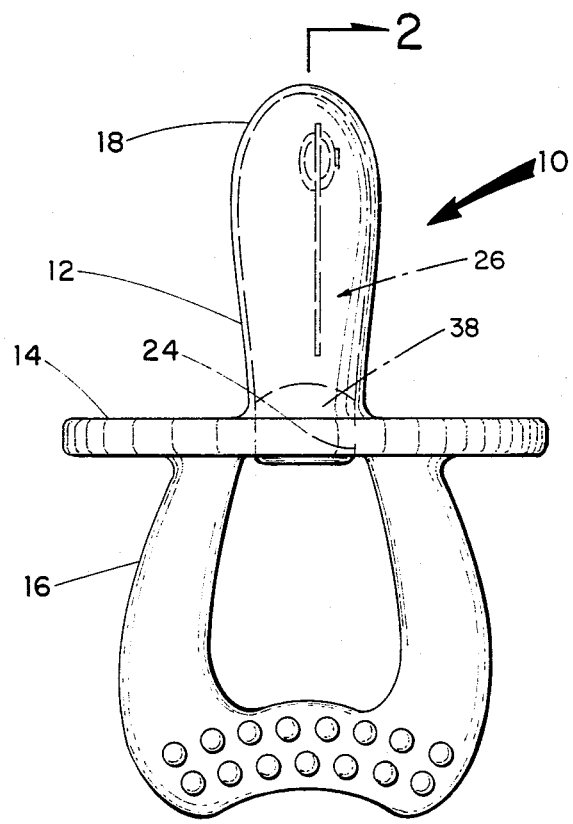
FIG. 1 is an elevational view of the improved pacifier assembly of the present invention.
Figure 2:
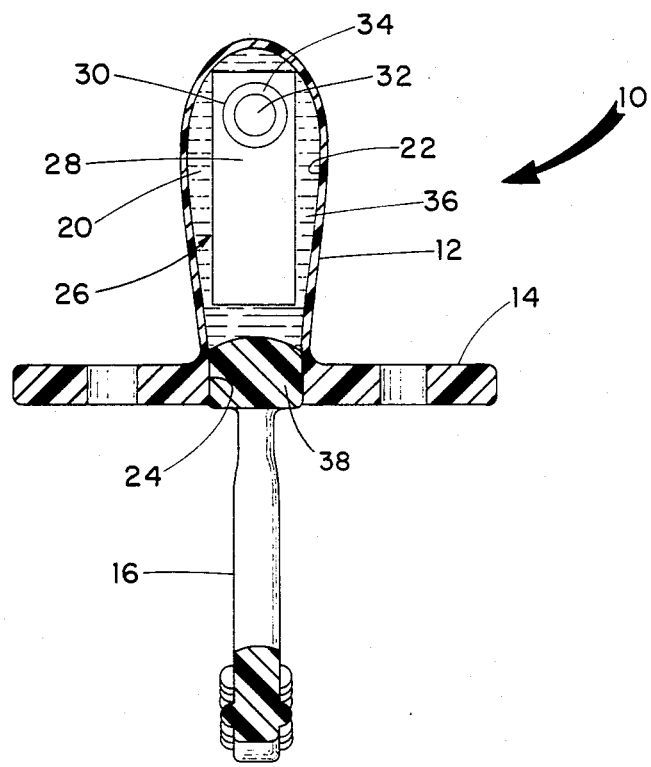
FIG. 2 is a cross-sectional view taken along the lines of 2—2 of FIG. 1.

Referring now to FIGS. 1 and 2, there is illustrated a temperature sensing pacifier assembly, generally molded in one piece and generally indicated as 10, comprised of a bulb or nipple portion, a preventing guard portion and a handle portion, generally indicated as 12, 14 and 16, respectively. The pacifier assembly 10 of the present invention is formed of a non-toxic elastomeric material, such as a foodgrade transparent plasticized polyvinyl chloride or synthetic transparent rubber, or the like.

The nipple portion 12 is defined by an external bulbous surface 18 and is formed with an interior chamber 20 defined by an interior surface 22 with an orifice 24 in the guard portion 14 providing access to the interior chamber 20 thereof. In the interior chamber 20 of the nipple portion 12, there is provided a temperature responsive element 26 comprised of a rectangularlyshaped transparent thermoplastic strip 28, on which is mounted one or more temperature display dots, generally is indicated as 30, comprised of a liquid crystal material 32 coated on pre-select colored substrate 34. The temperature responsive element 26 is therefore positioned within the chamber 20 in an elastomeric compatible liquid 36, as hereinafter more fully described.

The temperature display dots 30 are preferably mounted on end surface portions of the thermoplastic strip 28 with the thermoplastic strip 26 being preferably formed of a clear thermoplastic material. The temperature responsive element 26 is positioned with in the chamber 20 of the nipple portion 12 of the temperature-responsive pacifier assembly 10 in a manner to position the temperature display dots 30 proximate the end of the nipple portion 12 opposite the guard portion 14. In this manner, insertion into the oral cavity of a mammal permits positioning of the temperature display dots more deeply within the oral cavity whereby heat transfer between the oral cavity and the temperature display dots 30 permits of a more rapid response period to an above normal temperature conditions of the mammal.

The temperature response element 26 disposed in the elastomeric compatible liquid 36 is sealed, such as by an adhesive, ultrasonics, radio frequency or the like, within the chamber 20 of the pacifier assembly 10 by a food grade elastomeric material, such a plasticized vinyl chloride plug 38 an elastomeric material for the pacifier assembly 10 as well as the plug 38 is dictated by the desirability of durability to substantially eliminate direct shearing conditions under which the outer surface 18 of the nipple portion 12 of the pacifier assembly 10 may be subjected against the capsule, particularly during teething of a using individual.

Liquid crystals are well known to one skilled in the art. Liquid crystals materials formulations displaying a color change above 98.6° F., and preferably at a temperature above about 100° F., ±¼° F. is preferred as being representative of a temperature through which a positive identification may be made that a feverous condition exists above the normal body temperature of 98.6° F. This minimizes a reaction by an observer to an actual 98.6° F. normal condition a temperature of 100° F. of the mammal would more fully result in positive corrective steps, or at least further testing.

Cholesteric liquid crystals are preferred since such cholesteric liquid crystals are non-toxic and readily passed through the body if accidentally ingested by the pacifier user. Example of an cholesteric liquid crystal exhibiting a color change display at 100° F. is a mixture of p-n-Pentylphenyl-p-methoxybenzoate (PPMEOB) and p-n-Pentylphenyl-p-n-pentylbenzoate (PPPEB). Other cholesteric liquid crystal materials exhibiting like display temperatures are disclosed in the aforementioned United States Letters Patent to Fergason.

Generally, cholesteric liquid crystals exhibit an iridescence color at temperatures below the response or clearing temperature, e.g. a bright green irridescent color is visually exhibited by a cholesteric liquid crystal material comprised of a mixture of p-n-Pentylphenyl-p-methoxybenzoate (PPMEOB) and p-n-Pentylphenyl-p-n-pentylphenzoate (PPPEB) exhibiting a clearing temperature at 100° F.±¼° F. Thus, in the instant invention such a liquid crystal material 32 provides a bright green iridescence and when coated on a black substrate 34 will result in a change in the color appearance from a bright green to black of the temperature responsive dot 26, when a temperature of 98.6° F. has been exceeded readily visually identifiable by an observer.

The elastomeric compatible liquids are thermally conductive, such as glycerine, a fluid which does not de-plasticize the plasticized polyvinyl chloride when compared to most vegetable and mineral oils. The use of such vegetables and mineral oils is not desired since such oils dissolve the plasticized materials thereby permitting the nipple assembly to become tough and rigid over short periods of time. Glycerine, not being an oil does not de-plasticize the polyvinyl chloride composition forming the nipple assembly 10 and is compatible with the materials forming the temperature responsive element 26. A bitter additive, such as quinine or the like, is added to the elastomeric compatible liquid. Should a child accidently rupture the fluid filled cavity of the pacifier, quinine or the like additive causes the unit to reject the damaged pacifier.

The pacifier assembly 10 may be formed in a like manner as that of the aforementioned copending application, i.e. after positioning of the temperature responsive element 26 and addition of an appropriate elastomeric compatiable liquid 36, the pacifier assembly 10 is then sealed with a clear PVC cement which is allowed to form a permeating miniscus type geometry at the pre-filled pacifier orifice 24, such a PVC cement being of a composition similar to the pacifier assembly 10. The thus formed temperature sensitive pacifier assembly 10 is maintained in the hereinabove described portion for a period of at least about 12 hours prior to bulk packaging.

Once the pacifier assembly 10 of the present invention changes color indicating an abnormal temperature level as a result of use by an individual, resort to a mercurial thermometer is generally contemplated as part of a use protocol of the instant invention. Once removed from the mouth of a user, the liquid crystal material will resume its initial color after a predetermined time period at ambient room temperature.

While the present invention has been described with a liquid crystal materials displaying color change temperature level of 98.6° F., preferably of 100° F.±¼° F., it will be understood by one skilled in the art that slight variations may be made to such color change temperature level. One skilled in the art will appreciate that the composition of the liquid crystal may be formulated to effect different color changes other than the above described green to black.

Generally, liquid crystal materials displaying the desired color changing protocol herein described generally are adversely effected by the elastomeric material of the pacifier and thus cannot be formulated, per se, in the elastomeric material of the pacifier assembly although some liquid crystals may exist which may be included in such a formulation. Microencapsulation of the liquid crystal materials, as distinguished from macroencapsulation, as herein described, would permit formulation with the elastomeric material, particularly for molding the nipple portion of the pacifier assembly thereby providing a more efficacious process for forming such temperature responsive pacifier assemblies.

Numerous modifications and variations of the invention are possible in light of the above teachings and therefore the invention may be practiced otherwise than as particularly described.

What is claimed:

1. An improved heat-responsive pacifier assembly, which comprises of:

a pacifier body including a nipple portion defining an interior chamber sealable by plug means; and a temperature responsive element and a liquid sealingly positioned in said interior chamber of said nipple portion of said pacifier body, said temperature responsive element comprised of an elongated strip element having thereon a disposed temperature display means including a liquid crystal composition displaying a color change visually through said pacifier body at a temperature above about 98.6° F.

2. The improved heat-responsive pacifier assembly as defined in claim 1 whereas said pacifier body is formed of an elastomeric material and the interior of said chamber includes an elastomeric compatible liquid sealed therein.

3. The improved heat-responsive pacifier assembly as defined in claim 1 wherein said liquid crystal composition displays a color change at a temperature of 100° F.

4. The improved heat-responsive pacifier assembly as defined in claim 1 wherein said temperature display means is comprised of at least one temperature display dot.

5. The improved heat-responsive pacifier assembly as defined in claim 4 wherein said temperature display dot is disposed on an end portion of said elongated element and said temperature responsive element is positioned in said interior chamber in a manner such that said temperature display dot is proximate a terminal end portion of said nipple portion of said pacifier body.

6. The improved heat-responsive pacifier assembly as defined in claim 5 wherein said temperature display dot is comprised of a liquid crystal material coated on a colored substrate mounted on said elongated element.

7. The improved heat-responsive pacifier assembly as defined in claim 6 wherein said elongated element is a thin strip formed of a clear thermoplastic material.

8. The improved heat-responsive pacifier assembly as defined in claim 5 wherein said elastomeric material is food grade plasticized polyvinyl choloride.

9. The improved heat-responsive pacifier assembly as defined in claim 8 wherein said elastomeric compatible liquid is glycerine.

10. The heat-responsive pacifier assembly as defined in claim 9 wherein said elastomeric material is a glycerine based elastomer.

11. The improved heat-responsive pacifier assembly as defined in claim 1 wherein said interior chamber is sealed by said plus means using a polyvinyl chloride cement.

12. The improved heat-responsive pacifier assembly as defined in claim 2 including a bittering agent admixed with said elastomeric compatible liquid.

13. The improved heat-responsive pacifier assembly as defined in claim 12 wherein said bittering agent is quinine.

* * * * *